(12) United States Patent
Geese et al.

(10) Patent No.: US 10,321,085 B2
(45) Date of Patent: Jun. 11, 2019

(54) PIXEL UNIT FOR AN IMAGE SENSOR, IMAGE SENSOR, METHOD FOR SENSING A LIGHT SIGNAL, METHOD OF CONTROLLING A PIXEL UNIT, AND METHOD FOR GENERATING AN IMAGE USING A PIXEL UNIT

(71) Applicant: Robert Bosch GmbH, Stuttgart (DE)

(72) Inventors: Marc Geese, Ostfildern Kemnat (DE); Ulrich Seger, Leonberg-Warmbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 197 days.

(21) Appl. No.: 15/619,879

(22) Filed: Jun. 12, 2017

(65) Prior Publication Data

US 2018/0020177 A1 Jan. 18, 2018

(30) Foreign Application Priority Data

Jul. 13, 2016 (DE) .................. 10 2016 212 765

(51) Int. Cl.
*H04N 5/378* (2011.01)
*H04N 5/217* (2011.01)
*H01L 27/00* (2006.01)

(52) U.S. Cl.
CPC .................. *H04N 5/378* (2013.01)

(58) Field of Classification Search
CPC .......... H04N 5/378; H04N 5/217; H04N 3/14; H01L 27/00
USPC ..................................................... 250/208.1
See application file for complete search history.

(56) References Cited

U.S. PATENT DOCUMENTS

| | | | |
|---|---|---|---|
| 6,078,037 A | 6/2000 | Booth, Jr. | |
| 6,121,843 A * | 9/2000 | Vampola | G11C 27/026 250/214 A |
| 6,518,558 B1 | 2/2003 | Bohm et al. | |
| 6,803,555 B1 | 10/2004 | Parrish et al. | |
| 7,286,174 B1 | 10/2007 | Weale et al. | |
| 8,063,965 B2 * | 11/2011 | Wang | H04N 5/243 348/308 |
| 2004/0169753 A1 | 9/2004 | Gulbransen et al. | |
| 2013/0135486 A1 | 5/2013 | Wan | |
| 2013/0141619 A1 | 6/2013 | Lim et al. | |
| 2015/0085988 A1 | 3/2015 | Mollov | |

FOREIGN PATENT DOCUMENTS

EP 2060887 A1 5/2009
WO 2011155442 A1 12/2011

* cited by examiner

*Primary Examiner* — Seung C Sohn
(74) *Attorney, Agent, or Firm* — Norton Rose Fulbright US LLP; Gerard Messina (57) ABSTRACT

A pixel unit for an image sensor. The pixel unit includes a photodiode for converting alight signal into a processing signal, a multiplexer unit that is designed for using the processing signal to generate at least a first multiplexer signal and a second multiplexer signal that deviates therefrom, and a storage device having at least a first storage unit for buffer storing a time-limited integral value of the first multiplexer signal and a second storage unit for buffer storing a time-limited integral value of the second multiplexer signal. The pixel unit makes possible a time-overlapped sampling of the first multiplexer signal and of the second multiplexer signal.

15 Claims, 6 Drawing Sheets

PIXEL UNIT FOR AN IMAGE SENSOR, IMAGE SENSOR, METHOD FOR SENSING A LIGHT SIGNAL, METHOD OF CONTROLLING A PIXEL UNIT, AND METHOD FOR GENERATING AN IMAGE USING A PIXEL UNIT

CROSS REFERENCE

The present application claims the benefit under 35 U.S.C. § 119 of German Patent Application No. DE 102016212765.9 filed on Jul. 13, 2016, which is expressly incorporated herein by reference in its entirety.

BACKGROUND INFORMATION

The present invention relates to a device, a method, and a computer program.

Sampling performed by an image sensor typically requires an exposure time that is relatively short in comparison to a resulting image frame rate. The exposure time functions as a low-pass filter, which, in an idealized consideration, can be regarded as a square wave in the time domain.

SUMMARY

The present invention includes a pixel unit for an image sensor, an image sensor, a method for sensing a light signal, a method for controlling a pixel unit, a method for generating an image using a pixel unit; in addition, a device that employs at least one of these methods; and, finally, a respective computer program. Advantageous embodiments of the device are described herein.

A pixel unit for an image sensor is provided, the pixel unit having the following features:
a possibly complex photodiode for converting a light signal into a processing signal;
a multiplexer unit designed to use the processing signal to generate at least a first multiplexer signal and a second multiplexer signal that deviates therefrom; and
a storage device having at least a first storage unit for buffer storing a time-limited integral value of the first multiplexer signal and a second storage unit for buffer storing a time-limited integral value of the second multiplexer signal.

This allows time-overlapped sampling of the low-pass filtered multiplexer input signal. An image signal, which represents an image recorded by the pixel unit, may be reconstructed from the time-limited integral values of the two multiplexer signals stored in the storage devices.

Using the processing signal, a plurality of different signals may advantageously be synchronously generated, for example, at least two or at least three, and, in accordance with a specific embodiment, for each continuous instant, or at least for many discrete instants.

A pixel unit may be understood to be a unit for sensing a light signal. A photodiode may be understood to be a possibly complex, light-sensitive element for converting a photon stream into an electron stream. A light signal may be understood, for instance, to be a continuous-time electromagnetic signal that is not constant and has any (spatial and temporal) (modulation) rate of change. A processing signal may be understood to be an electrical output signal from the photodiode. A multiplexer unit may be understood to be a signal multiplexer. For example, the multiplexer unit may be designed as a continuous divider, as a discrete-time divider, thus as a time division multiplexer. A multiplexer signal may be understood to include signals generated by the multiplexer unit by amplifying the processing signal, for example. The first and the second storage units may each be capacitors, for example. In accordance with a specific embodiment, the deviation between the multiplexer signals results from a signal amplification, respectively attenuation (thus multiplication) performed during generation of at least one of the signals.

The approach presented here is based on the realization that, by using a hardware structure composed of a multiplexer, in combination with at least two storage units, it is possible to adapt a pixel design and a pixel readout structure of an image sensor in a way that allows a low-pass filter to temporally correctly sample a light signal.

In accordance with a specific embodiment, the multiplexer unit may be designed for amplifying the processing signal by a first amplification factor to generate the first multiplexer signal or, additionally or alternatively, for amplifying it by a second amplification factor to generate the second multiplexer signal. The first amplification factor and the second amplification factor may deviate from one another. This specific embodiment allows the storage units to be variably loaded as a function of the instant the first multiplexer signal and the second multiplexer signal are generated.

In accordance with a specific embodiment, the multiplexer unit may be designed for synchronously generating the first multiplexer signal and the second multiplexer signal. If further multiplexer signals are generated, then they may likewise be generated synchronously. The multiplexer unit in accordance with this specific embodiment may advantageously be in the form of a continuous divider.

In accordance with another specific embodiment, the multiplexer unit may be designed for generating the first multiplexer signal at a first instant and the second multiplexer signal at a second instant. This presents itself, in particular, when the processing signal is a discrete-time signal. However, this approach may also be used for a continuous-time processing signal. In accordance with this specific embodiment, the multiplexer unit may be in the form of a discrete-time divider.

In accordance with another specific embodiment, the photodiode, the multiplexer unit and the storage device may be serially interconnected. In this case, the first storage unit and the second storage unit may be parallel interconnected. This makes possible a simple and rugged interconnection within the pixel unit.

It is also advantageous when the pixel unit features a readout contact for synchronously and separately reading out the first storage unit and the second storage unit. A readout contact may be understood to be a contact element that is electroconductively connected to the first storage unit and the second storage unit. This permits a simple electrical contacting of the pixel unit.

In addition, the photodiode may be designed to feed the multiplexer unit a continuous electrical current as the processing signal. Using the processing signal, the multiplexer unit may be designed here to generate a first electrical current as the first multiplexer signal and a second electrical current, which deviates therefrom, as the second multiplexer signal. The multiplexer unit may be thereby realized as a continuous divider.

Alternatively, the complex photodiode may be designed for feeding a discrete-time signal featuring a time scheme as the processing signal, to the multiplexer unit. In accordance with a specific embodiment, the multiplexer unit is designed for using the time scheme to generate the first multiplexer signal and the second multiplexer signal. For example, a first pulse of the processing signal may be fed to the first storage unit, and a subsequent second pulse of the processing signal to the second storage unit. In such a case, the pulses may still each be appropriately amplified, for example, manipulated or multiplied by the multiplexer unit.

In accordance with another specific embodiment, the pixel unit may feature at least one additional storage unit, interposed between the photodiode and the multiplexer unit, for buffer storing the processing signal. The multiplexer unit may be designed here to generate the first multiplexer signal or, additionally or alternatively, the second multiplexer signal, using a processing signal buffer stored in the additional storage unit. The additional storage unit may be an intermediate circuit capacitor, for example. This makes it possible to ensure an efficient processing of even weak light signals.

In accordance with a specific embodiment, the additional storage unit constituting an additional capacitance is charged with a few electrons in the "pulsed mode" directly following the photodiode and then multiplexed in the individual storage modes that are associated with the buffer memories. This makes possible a low capacitance for a substantial amplification.

In the continuous mode, this capacitance (if present) is continuously discharged by the continuous operation of the multiplexer. Thus, if indicated, the capacitance also already functions as a low-pass filter, for example as an RC circuit.

In accordance with one specific embodiment, in the continuous mode without the capacitor, the multiplexer does not function with voltages, but with currents.

The pixel unit may be realized by a multilayer composite of a first semiconductor layer and a second semiconductor layer. The photodiode may be configured here in the first semiconductor layer. Depending on the specific embodiment, the multiplexer unit, or, additionally or alternatively, the storage device may be configured in the second semiconductor layer. The multilayer composite may be what is commonly known as a stacked die composite, for example. This specific embodiment allows the pixel unit to be miniaturized cost-effectively.

A semiconductor layer may be optionally in the form of a wafer or a silicon-based functional unit.

In accordance with another specific embodiment, the multiplexer unit may be designed to use the processing signal to generate synchronously or at least at another instant another multiplexer signal, that deviates at least from the first multiplexer signal or, additionally or alternatively, from the second multiplexer signal. Correspondingly, the storage device may have at least one further storage unit for buffer storing a time-limited integral value of the further multiplexer signal. This makes it possible to increase the number of buffer stored multiplexer signals.

The approach presented here also provides an image sensor having at least one pixel unit in accordance with one of the preceding specific embodiments.

Moreover, the approach described here provides a method for sensing a light signal, the method including the following steps:
converting the light signal into a processing signal;
using the processing signal to generate at least a first multiplexer signal and a second multiplexer signal that deviates therefrom; and
buffer storing a time-limited integral value of the first multiplexer signal in a first storage unit and a time-limited integral value of the second multiplexer signal in a second storage unit.

This method may be implemented, for example, using a pixel unit in accordance with one of the preceding specific embodiments.

In addition, the approach presented here also provides a method for controlling a pixel unit in accordance with one of the preceding specific embodiments, the method including the following steps:
inputting the processing signal; and
using the processing signal to output a control signal for controlling the multiplexer unit.

In accordance with a specific embodiment, an independent "timer" supplies the multiplexer with a control signal thereof, thus with a first multiplexer signal having any desired weighting function $G1(t)$ and with a second multiplexer signal having any desired weighting function $G2(t)$. The weighting signals may be globally generated.

The present invention also provides a method for generating an image using a pixel unit in accordance with one of the preceding specific embodiments, the method including the following steps:
inputting the first multiplexer signal and the second multiplexer signal via an interface to the storage device; and
reconstructing an image signal representing the image using the first multiplexer signal and the second multiplexer signal.

These methods may be implemented as software or hardware, for example, or as a software and hardware hybrid, in a control unit, for example. In particular, an implementation may be accomplished in the lower layer in the stacked die.

The reconstruction may advantageously take place in the sensor-free layer of the stacked die to avoid having to provide many memory stores in the overall system.

To this end, the device may have at least one processing unit for processing signals or data, at least one storage unit for storing signals or data, at least one interface to a sensor or an actuator for inputting sensor signals from the sensor or for outputting data signals or control signals to the actuator, and/or at least one communication interface for inputting or outputting data that are embedded in a communication protocol. The processing unit may be a signal processor, a microcontroller or the like, for example, it being possible for the storage unit to be a flash memory, an EPROM or a magnetic storage unit. The communication interface may be adapted for inputting or outputting data wirelessly and/or by wire; a communication interface, capable of inputting or outputting data by wire, then inputting these data, for example, electrically or optically from a corresponding data transmission line or outputting them into a corresponding data transmission line.

A device may be understood here to be an electrical device that processes sensor signals and outputs control and/or data signals as a function thereof. The device may have an interface implemented as hardware and/or software. When implemented as hardware, the interfaces may be the part of what are commonly known as system ASICs, for example, that include a wide variety of device functions. However, the interfaces may also be separate, integrated circuits or be at least partially composed of discrete components. When implemented as software, the interfaces may be software modules that are present on a microcontroller, for example, in addition to other software modules.

Also advantageous is a computer program product or computer program having program code, which may be stored on a machine-readable medium or storage medium, such as a semiconductor memory, a hard disk or an optical storage medium, and is used to perform, implement and/or control the steps of the method in accordance with one of the aforedescribed specific embodiments, particularly when the program product or program is executed on a computer or a device.

Exemplary embodiments of the present invention are illustrated in the figures and explained in greater detail below.

DETAILED DESCRIPTION OF EXAMPLE EMBODIMENTS

In the following description of advantageous exemplary embodiments of the present invention, the same or similar reference numerals are used for the elements that are shown in the various figures and whose function is similar, there being no need to repeat the description of these elements.

Figure 1:
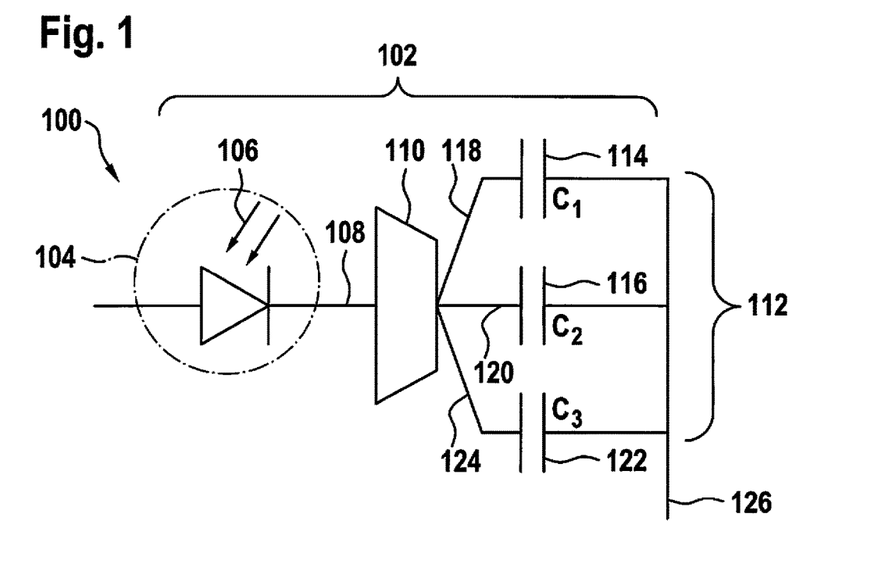
FIG. 1 schematically shows a light sensor of an image sensor in accordance with an exemplary embodiment.

FIG. 1 schematically shows a light sensor of an image sensor 100 in accordance with an exemplary embodiment. Shown is a basic design of a pixel structure that allows image sensor 100 to perform temporally correct sampling. Image sensor 100 includes a pixel unit 102 having a photodiode 104 for converting a light signal 106 into a processing signal 108, a multiplexer unit 110, as well as a storage device 112 composed of a first storage unit 114 and a second storage unit 116. Storage device 112 is linked to a multiplexer output of multiplexer unit 110. In accordance with this exemplary embodiment, photodiode 104, multiplexer unit 110, and storage device 112 are serially interconnected. Multiplexer unit 110 is designed for generating a first multiplexer signal 118 and at least a second multiplexer signal 120 from processing signal 108 synchronously or at different points in time. In the case of a synchronous generation, multiplexer unit 110 may be configured as a continuous multiplexer. In the case of a generation at different points in time, multiplexer unit 110 may be configured as a discrete-time multiplexer. Multiplexer unit 110 is designed for transmitting first multiplexer signal 118 via multiplexer output into first storage unit 114 that is configured for buffer storing a time-limited integral value of first multiplexer signal 118. Accordingly, multiplexer unit 110 is designed for transmitting second multiplexer signal 120, analogously to first multiplexer signal 118, via the multiplexer output into second storage unit 116, and for buffer storing a time-limited integral value there.

In accordance with FIG. 1, in addition to the two storage units 114, 116, storage device 112 includes at least one optional further storage unit 122 for buffer storing at least one further multiplexer signal 124 that multiplexer unit 114 generates using processing signal 108. The at least three storage units 114, 116, 122 are parallel interconnected, for example, and each electroconductively connected in a switchable manner to a readout contact 126 for synchronously outputting the three buffer stored multiplexer signals 118, 120, 124. In accordance with the exemplary embodiment shown in FIG. 1, the three storage units 114, 116, 122 are in the form of three capacitors C1, C2, C3.

Figure 2:
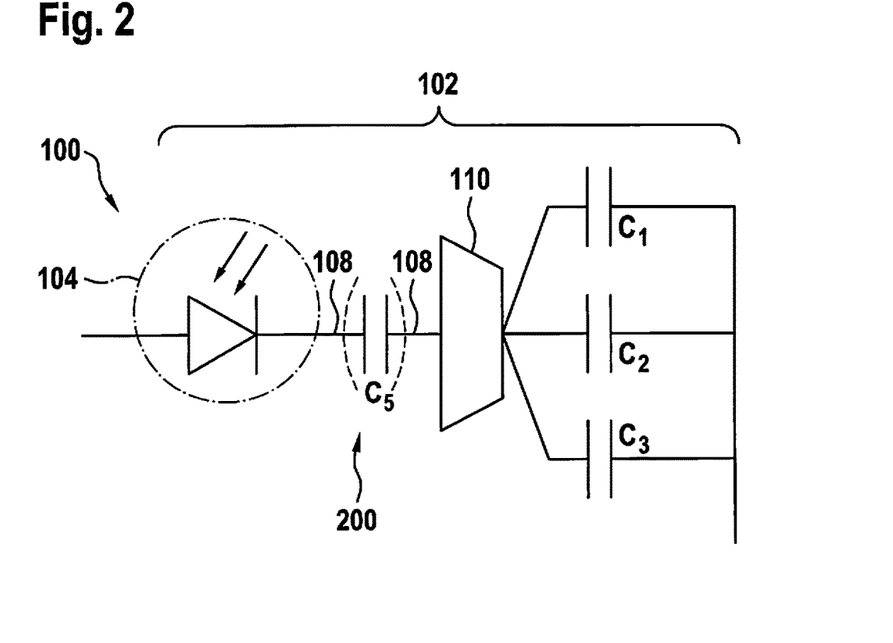
FIG. 2 schematically shows an image sensor in accordance with an exemplary embodiment.

FIG. 2 schematically shows an image sensor 100 in accordance with an exemplary embodiment. Image sensor 100 shown in FIG. 2 essentially corresponds to the image sensor previously described with reference to FIG. 1, with the distinction that an optional additional storage unit 200 is connected between photodiode 104 and multiplexer unit 110, in this case an additional capacitor $C_S$ as a buffer storage downstream of photodiode 104. Additional storage unit 200 is configured for buffer storing processing signal 108, multiplexer unit 110 receiving buffer stored processing signal 108 from additional storage unit 200 and processing in a manner previously described with reference to FIG. 1.

Figure 3:
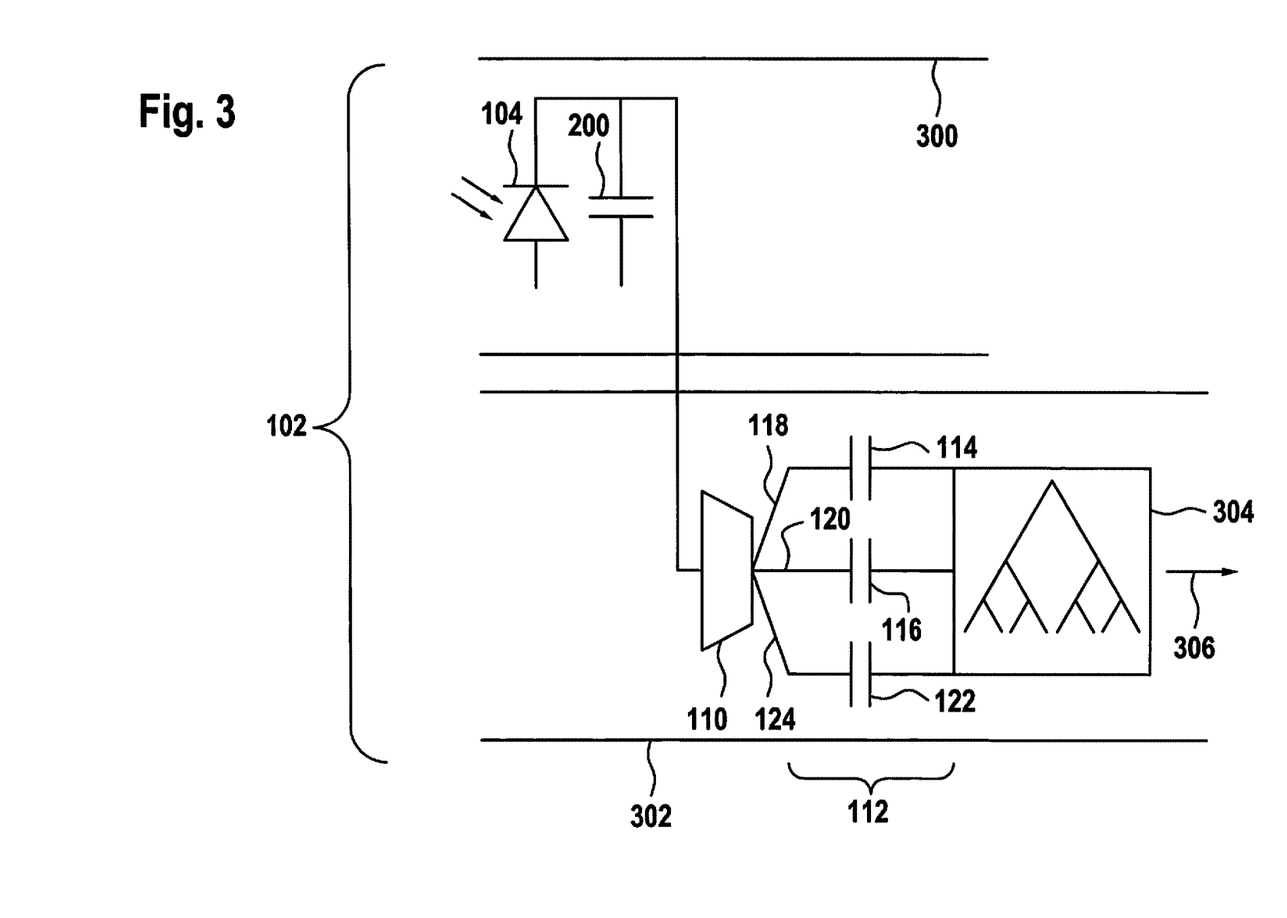
FIG. 3 schematically shows an image sensor in accordance with an exemplary embodiment.

FIG. 3 schematically depicts an image sensor 100 in accordance with an exemplary embodiment, for instance an image sensor, as previously described with reference to FIG. 2. It shows the pixel structure being divided into photon-electron conversion and signal conditioning in stacked die technology. For this, pixel unit 102 is realized using a multilayer composite of a first semiconductor layer 300, also referred to as signal generation layer, and a second semiconductor layer 302, also referred to as signal post-processing layer. First semiconductor layer 300 includes photodiode 100, as well as additional storage unit 200. Second semiconductor layer 302 includes multiplexer unit 110, storage device 112, as well as a device 304 for generating an image signal 306 representing an image. Device 304, which is connected, for example, via the readout contact to the three storage units 114, 116, 122, is configured for reconstructing temporal image signal 306 using the three memory contents, also referred to as memory signals.

In such a case, it holds for all described exemplary embodiments that multiplexer signals 118, 120, 124 are not low-pass filtered. The low-pass filtering first occurs in storage devices 114, 116, 122 configured here as capacitors. Reconstruction is then carried out from the memory signals referred to here as capacitor signals.

Figure 4:
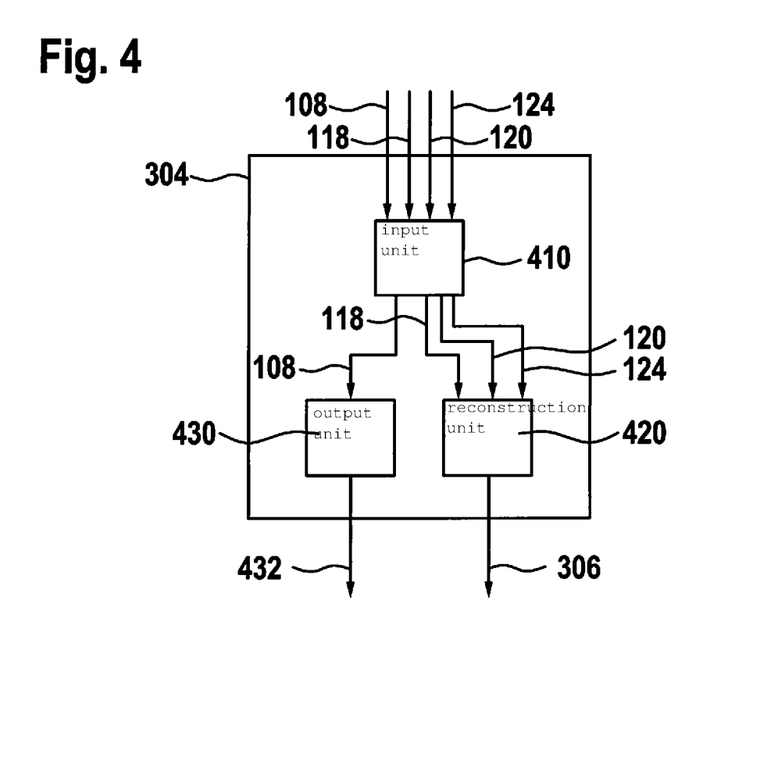
FIG. 4 schematically shows a device in accordance with an exemplary embodiment.

FIG. 4 schematically depicts a device 304 in accordance with an exemplary embodiment, for instance a device, as previously described with reference to FIG. 3. Device 304 includes an input unit 410 for inputting three multiplexer signals 118, 120, 124. A reconstruction unit 420 is designed for reconstructing image signal 306 from storage devices 114, 116, 122 using the three memory signals.

In accordance with this exemplary embodiment, input unit 410 is also designed for inputting processing signal 108 and for transmitting it to an output unit 430. Output unit 430 is designed for outputting a control signal 432 in response to receiving processing signal 108, in order to control the multiplexer unit.

Figure 5:
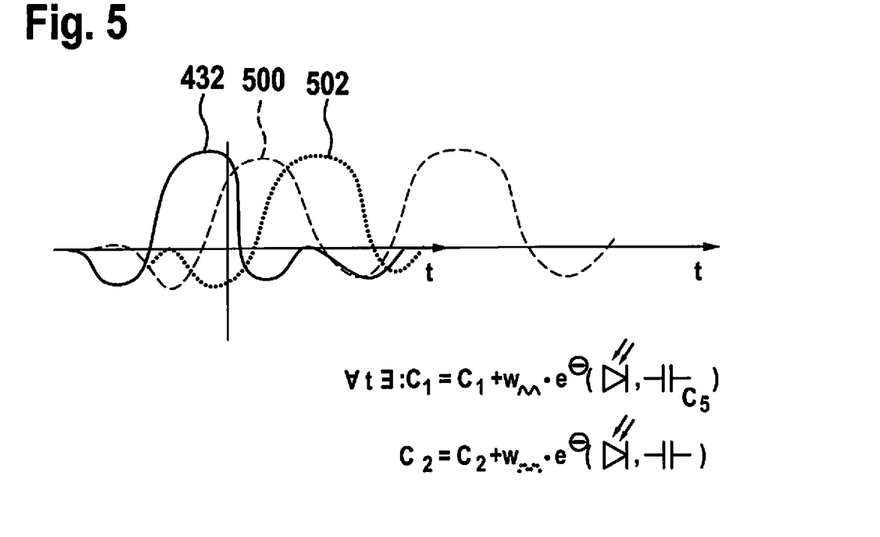
FIG. 5 is a diagram for schematically illustrating three control signals for controlling a multiplexer unit in accordance with an exemplary embodiment.

FIG. 5 is a diagram for schematically illustrating three control signals 432, 500, 502 for controlling a multiplexer unit in accordance with an exemplary embodiment. The three control signals may be generated, for example, by a device previously described with reference to FIGS. 3 and 4. At every point in time, there is a signal weight for each memory node C of the storage device.

Figure 6:
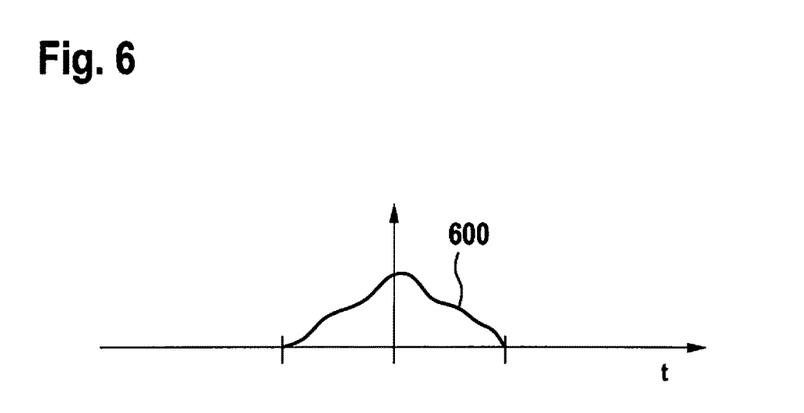
FIG. 6 is a diagram for schematically illustrating a low-pass filter characteristic.

FIG. 6 is a diagram for schematically illustrating a low-pass filter characteristic 600. Shown is the low-pass filter characteristic of a nominal sampling having an essentially triangular curve shape.

Figure 7:
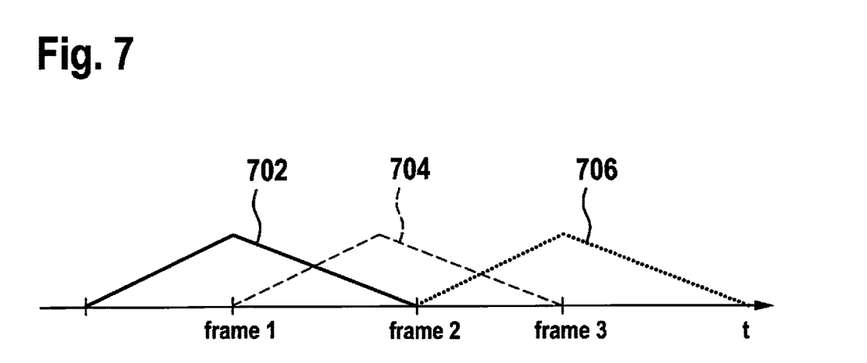
FIG. 7 is a diagram for schematically illustrating an exposure scheme for using appropriate overlapping low-pass filters for ideal temporal sampling.

FIG. 7 is a diagram for schematically illustrating an exposure scheme for ideal temporal sampling by respective overlapping low-pass filters 700, 702, 704, 702, 704, 706.

Figure 8:
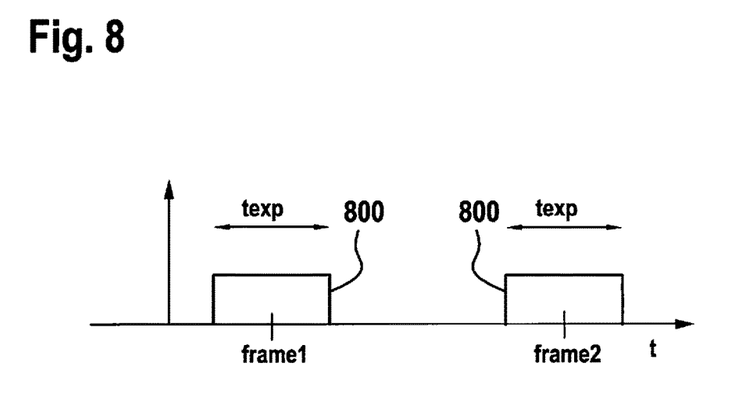
FIG. 8 is a diagram for schematically illustrating an image sensor performing a typical temporal sampling.

FIG. 8 is a diagram for schematically illustrating an image sensor performing a typical temporal sampling. Shown is a square wave signal 800 representing a low-pass filter in the time domain.

Figure 9:
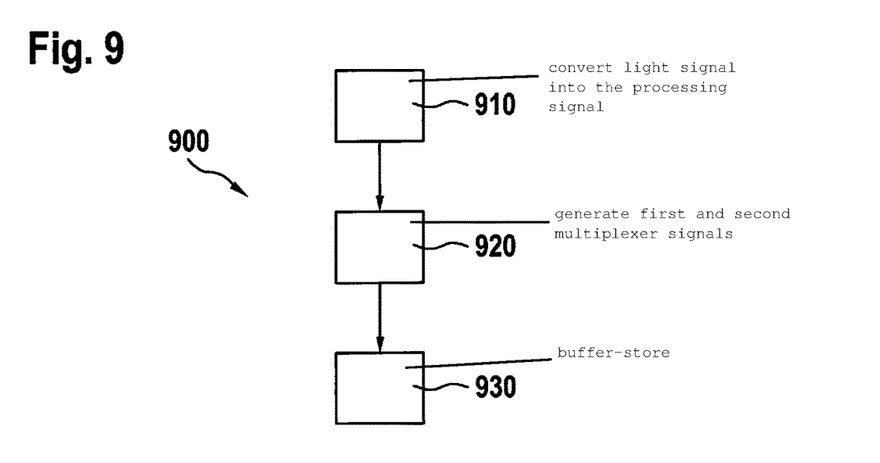
FIG. 9 shows a flow chart of an exemplary embodiment of a method for sensing a light signal.

FIG. 9 shows a flow chart of an exemplary embodiment of a method 900 for sensing a light signal. Method 900 may be carried out, for example, using a pixel unit as previously described with reference to FIG. 1 through 5. In this case, the light signal is converted into the processing signal in a first step 910. In a further step 920, the first multiplexer signal and the second multiplexer signal deviating therefrom are generated using the processing signal. Finally, in a step 930, a time-limited integral value of the first multiplexer signal is buffer stored in the first storage unit, and a time-limited integral value of the second multiplexer signal in the second storage unit.

Figure 10:
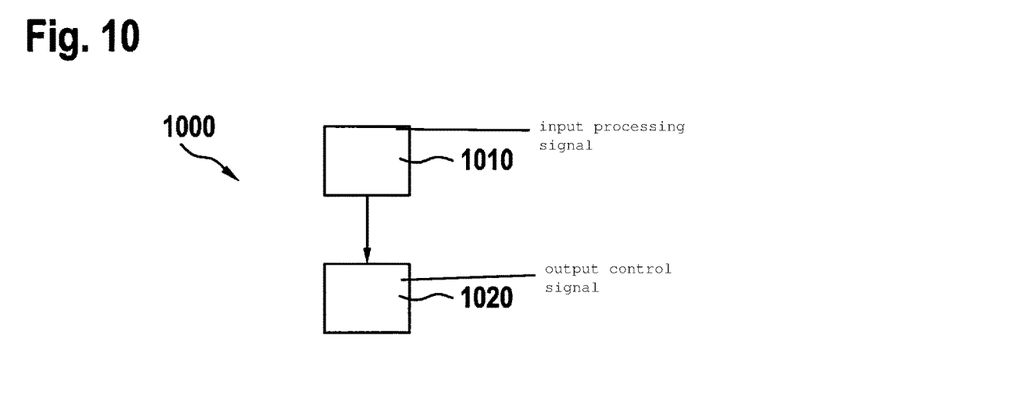
FIG. 10 is a flow chart of a method for controlling a pixel unit in accordance with an exemplary embodiment.

FIG. 10 shows a flow diagram of a method 1000 for controlling a pixel unit in accordance with an exemplary embodiment, such as of a pixel unit, as previously described with reference to FIG. 1 through 5.

In this case, the processing signal is input in a first step 1010. In a second step 1020, the control signal for controlling the multiplexer unit of the pixel unit is output using the processing signal.

Figure 11:
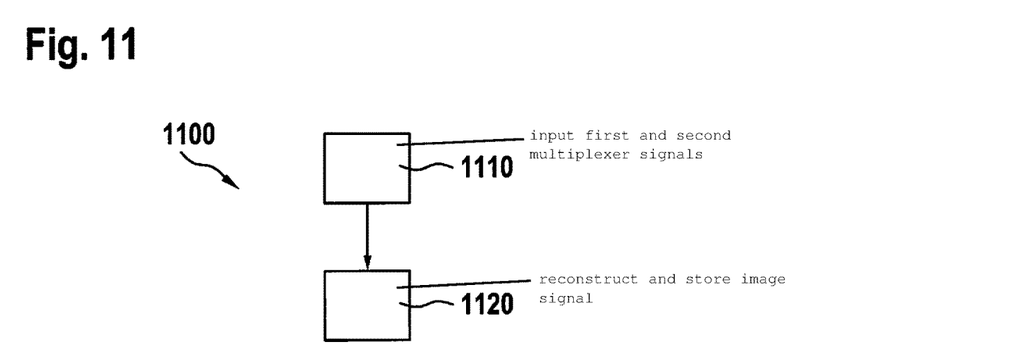
FIG. 11 is a flow chart of a method for generating an image using a pixel unit in accordance with an exemplary embodiment.

FIG. 11 shows a flow chart of a method 1100 for generating an image using a pixel unit in accordance with an exemplary embodiment, for instance a pixel unit, as previously described with reference to FIG. 1 through 5. Here, in a first step 1110, the first multiplexer signal and the second multiplexer signal are input via an interface to the storage device, for instance via the readout contact. In a second step 1120, the image signal representing the image is reconstructed using the time-limited integral values of the two multiplexer signals stored in the storage devices.

The approach presented here is described again in different words in the following with reference to FIG. 1 through 11.

Present-day image sensors typically function in accordance with the following principle. An optical system generates a light image on a planar sensor, also referred to as an image sensor or imager. The image sensor samples this image spatially and temporally. The temporal sampling is defined by the image frame rate, in some designs also by the individual light sensor sampling rate.

The customary camera components thereby fulfill the following functions. The optical system functions as a spatial low-pass filter. Today, a light sensor is composed of several million individual light sensors, each light sensor constituting a spatial sampling point. The exposure time functions as a temporal low-pass filter.

For an aliasing-free sampling, the low-pass filter should be adapted to the sampling frequency in a way that allows the sampling frequency to be at least greater than twice the cut-off frequency of the low-pass filter in accordance with the Nyquist-Shannon sampling theorem. It subsequently holds that the signal should always propagate through the low-pass filter prior to the sampling.

If this does not occur, the sampled signal contains aliasing artefacts. The spatial aliasing effects are usually discernible as a color fringe at high contrast edges, by disappearing and reappearing on point-like objects, and as what is generally referred to as a Moiré effect on objects having a uniform, periodic pattern.

In the temporal signal, aliasing effects appear as rolling shutter effects, where a moving, straight object is imaged as a curved object, as wagon wheel effects, where a wheel appears to rotate backwards starting after a certain speed, and as problems when capturing pulsed light sources, such as LED traffic signs or the taillights of vehicles. The human eye also perceives such effects, showing that temporal aliasing effects cannot be completely prevented in this case either.

For applications in the machine vision sector, the optical flow is an important auxiliary quantity. The optical flow quality may be appreciably enhanced by a temporally correctly sampled signal.

The method of functioning of present-day image sensors is based on a relatively short exposure time in comparison to the resulting image frame rate. The exposure time acts as a low-pass filter, which, in an idealized consideration, may be regarded as a square wave in the time domain.

In the frequency domain, the square wave low-pass filter features width $t_{exp}$ as the Si function:

$$rect\left(\frac{t}{t_{exp}}\right) \circ - si(\pi f t_{exp.})$$

The first zero crossing of the Si curve is at:

$$\pi f t_{exp.} = \pi$$
$$f_{Grenz} = \frac{1}{t_{exp.}}$$

and, at the same time, represents a normal approximation of the cut-off frequency of the low-pass filter.

If customary exposure times of $t_{exp} \approx 500$ µs having customary image refresh rates or sampling frequencies of $t_{frame} \approx 1/30 \approx 33$ ms are compared, then the sampling frequency $f_{sample}$ and the cutoff frequency of low-pass filter $f_{Nyq.}$ are obtained:

$$f_{sample} = 30$$
$$f_{Nyq.} = \frac{1}{0.5 \cdot 10^{-3}} = 2 \cdot 10^3$$

However, according to the sampling theorem, it should hold that:

$$f_{Grenz} \approx f_{Nyq.}$$
$$f_{Nyq.} \leq \frac{1}{2} f_{sample}$$
$$\Rightarrow \text{nominal} \frac{f_{Nyq.}}{f_{sample}} \leq \frac{1}{2}$$

$$\Rightarrow \text{actual:} \frac{f_{Nyq.}}{f_{sample}} \le \frac{2}{3} \cdot 10^2$$

FIG. 8 shows the currently customary sampling scheme. Thus, the Nyquist theorem is clearly violated. This is not a problem as long as no high frequencies occur, as in the natural world, such as when clouds slowly pass by or in the case of photography.

In the video-based driver assistance sector, rapid scene changes are particularly important, especially in standard application cases, such as, for example, when computing the optical flow on pedestrian extremities, or when detecting LED lights, such as brake lights or traffic signs. For that reason, the light signal should also be temporally correctly sampled.

For a temporally correct sampling, $$\frac{f_{Nyq.}}{f_{sample}} \le \frac{1}{2}$$

should be fulfilled.

From this, however, it is also derived that:

$$2f_{Nyq.} \le f_{sample}$$
$$\Rightarrow 2\frac{1}{t_{exp.}} \le \frac{1}{t_{frame}}$$
$$\Rightarrow t_{exp.} \ge 2t_{frame}$$

This means that the exposure time for a correct sampling should last twice as long as a customary frame. In addition, an improved low-pass filter requires a temporally adapted signal modelling. FIGS. 6 and 7 show the Nyquist-conform sampling scheme.

In the Nyquist-conform case, the actual frame rate is dependent on the width of the low-pass filter. In the case of customary image sensors, an integration time longer than 1 ms during the day is difficult due to boundary conditions, such as SNR, or a design suited for nighttime use is hardly possible. As a result, the frame rate also increases in the case of a temporally correct sampling. However, this may again be reduced to a lower frame rate by a downstream image processing, in order to obtain the data rate. Since the output signal does not contain any aliasing effects, at a reduced frame rate, the final signal also does not contain any aliasing in the case of correct downsampling.

Depending on the low-pass design, the individual frames should, therefore, be weighted and exposed in an overlapping manner. This problem is already known as standard sampling in the context of image sensors in spatial sampling. While, spatially, an unsharpness of the optical system ensures that the signal is low-pass filtered beyond the pixel dimension, a corresponding counterpart for the time dimension is missing in the methods known heretofore.

On the other hand, the approach described here provides a pixel design option for realizing a temporal low-pass filter for a temporally correct sampling.

In the pixel design sector, it should be ensured that the signal is subject to an analog low-pass filtering before it is temporally quantized. In this case, photodiode 104 is used as a photon-to-electron converter. The output signal of the photodiode, also referred to as processing signal 108, should now be transmitted through an electrical-temporal low-pass filter. Appropriate implementation options are described in the following.

For each photodiode unit 104, two or more storage units are required for the overlapping of the temporal sampling. The storage units are realized as capacitors, for instance. While the integration in the first frame is not yet concluded, the integration of the second frame begins already. When the first frame is concluded, the integration of the third frame begins. Since the first frame also requires a finite read-out time, at least three storage units, for example, are connected to multiplexer unit 110. Generally, it holds that: if the low-pass filter is supposed to be wider than [have a wider bandwidth that of] the image frame rate, more storage units are needed in correspondence with the overlappings.

If the post-processing is complex enough, light signal 306 may be correctly reconstructed from the signals of the three storage units 114, 116, 122 at a desired instant and also output at the target frame rate subsequently to further low-pass filtering.

Moreover, it is possible here to compute and output the average variation in the signal between two points in time. This is also referred to as the time-gradient image.

From the individual exposures of the images, it is also possible to compute the extent of the time variance of the signal, also referred to as the feature mask. In this case, the reconstructed pixels are marked using a threshold value function. For example, if the signal of a sensor element varies within a sampling period by more than the threshold value, for example by more than 25 percent, then the image region in question is marked by a marker bit as fluctuating. This may be helpful for detecting artificial light sources. The threshold value may be adaptable.

Pixel unit 102 has a basic design having the following sequence: photodiode 104, optional additional storage unit 200, multiplexer unit 110, and memory capacitors 114, 116, 122. Functionally, multiplexer unit 110 ensures the temporal low-pass characteristics. FIG. 5 illustrates possible control signals that act upon multiplexer unit 110 in order to fulfill this task. For each point in time, multiplexer unit 110 provides a signal weight that corresponds to the low-pass characteristic.

This weight is applied to photodiode signal 108 or to the signal of additional storage unit 200.

Technically, multiplexer unit 110 is used, for example, as a continuous divider. To this end, processing signal 108 is realized as current and continuously fed to multiplexer unit 110. Depending on the point in time, it generates currents of different intensities for the individual storage units. Thus, multiplexer unit 110 is a complex circuit, which applies temporally distinct amplification factors to the photo stream and thus loads the storage units with varying intensity in accordance with the current points in time. Thus, relative to the sampling instant thereof, the storage units receive a temporally low-pass filtered signal at the end. This is important for the overall functioning method.

The described continuous process may also be realized as a temporally discrete process. In this regard, photodiode 104 is read out repeatedly during the low-pass time span, for example several hundred times. The result signal in the form of buffer-stored processing signal 108 is now present as an accumulated number of electrons, either in the junction capacitance or in additional storage unit 200. In multiplexer unit 110, these electrons are fed to the storage units in accordance with the actual weight.

The just described signal divider may also be transformed into the time domain. To that end, photodiode 104 is again read out several hundred times in the low-pass time span. However, the duration of an individual read-out pulse is now adapted to conform to the actual weight of the low-pass filter. Thus, multiplexer unit 110 feeds the signal generated per pulse to only one of the three memory nodes 114, 116, 122. This is useful when it is only possible to collect a few electrons in certain illumination situations.

In classic semiconductor processes, circuits are realized side by side in a planar 2D design. However, today's semiconductor processes have the capability of stacking and connecting a plurality of circuits in 3D arrays. This is also referred to as stacked die technology.

Complex hardware structures are needed for the case of temporally correct sampling, as mentioned above. Typically, a 2D design does not allow this to be realized cost-efficiently. However, this obstacle may be overcome using stacked die processes.

In this regard, the units for the photon-to-electron conversion are left in an upper layer 300, while multiplexer unit 110 and units for implementing further post-processing steps, for instance, to form gradients or to reconstruct signals at the frame instant, are displaced to a lower layer 302. Depending on the exemplary embodiment, a different fabrication technology may be used to also establish second layer 302 as first layer 300, for instance in 14 or 7 nm, thereby allowing appreciably more complex standard signal conditioning steps. FIG. 3 is a schematic view of this type of design of pixel unit 102.

If an exemplary embodiment includes an "AND/OR" logic operation between a first feature and a second feature, then this is to be read as the exemplary embodiment in accordance with a specific embodiment having both the first feature, as well as the second feature and, in accordance with another specific embodiment, either only the first feature or only the second feature.

What is claimed is:

1. A pixel unit for an image sensor, the pixel unit comprising:
   a photodiode for converting a light signal into a processing signal;
   a multiplexer unit designed to use the processing signal to generate at least a first multiplexer signal and a second multiplexer signal that deviates therefrom; and
   a storage device having at least a first storage unit for buffer storing the first multiplexer signal and a second storage unit for buffer storing a time-limited integral value of the second multiplexer signal.

2. The pixel unit as recited in claim 1, wherein the multiplexer unit is designed to amplify the processing signal to at least one of: generate the first multiplexer signal by a first amplification factor, and generate the second multiplexer signal by a second amplification factor.

3. The pixel unit as recited in claim 1, wherein the multiplexer unit is designed for synchronously generating the first multiplexer signal and the second multiplexer signal.

4. The pixel unit as recited in claim 1, where the multiplexer unit is designed for generating the first multiplexer signal at a first instant and the second multiplexer signal at a second instant.

5. The pixel unit as recited in claim 1, where the photodiode, the multiplexer unit, and the storage device are serially interconnected, the first storage unit and the second storage unit being parallel interconnected.

6. The pixel unit as recited in claim 1, further comprising:
   a readout contact for synchronously reading out the first storage unit and the second storage unit.

7. The pixel unit as recited in claim 1, wherein the photodiode is designed for feeding a continuous electrical current as the processing signal to the multiplexer unit.

8. The pixel unit as recited in claim 1, wherein the photodiode is designed for feeding a discrete-time signal having a time scheme as the processing signal to the multiplexer unit, and the multiplexer unit is designed for using the time scheme to generate the first multiplexer signal and the second multiplexer signal.

9. The pixel unit as recited in claim 1, further comprising:
   at least one additional storage unit interposed between the photodiode and the multiplexer unit for buffer storing the processing signal, the multiplexer unit being designed for using a processing signal buffer stored in the additional storage unit to generate at least one of the first multiplexer signal, and the second multiplexer signal.

10. The pixel unit as recited in claim 1, further comprising:
    a multilayer composite of a first semiconductor layer and a second semiconductor layer;
    wherein the photodiode is configured in the first semiconductor layer, and at least one of the multiplexer unit and the storage device being configured in the second semiconductor layer.

11. The pixel unit as recited in claim 1, wherein the multiplexer unit is designed to use the processing signal synchronously or at least at another instant to generate another multiplexer signal that deviates at least from at least one of the first multiplexer signal and the second multiplexer signal, the storage device having at least one further storage unit for buffer storing a time-limited integral value of the further multiplexer signal.

12. An image sensor having at least one pixel unit, the at least one pixel unit including a photodiode for converting a light signal into a processing signal, a multiplexer unit designed to use the processing signal to generate at least a first multiplexer signal and a second multiplexer signal that deviates therefrom, and a storage device having at least a first storage unit for buffer storing the first multiplexer signal and a second storage unit for buffer storing a time-limited integral value of the second multiplexer signal.

13. A method for sensing a light signal, the method comprising:
    converting the light signal into a processing signal;
    generating at least a first multiplexer signal and a second multiplexer signal that deviates therefrom using the processing signal; and
    buffer storing a time-limited integral value of the first multiplexer signal in a first storage unit and a time-limited integral value of the second multiplexer signal in a second storage unit.

14. A method for generating an image using a pixel unit, the pixel unit including a photodiode for converting a light signal into a processing signal, a multiplexer unit designed to use the processing signal to generate at least a first multiplexer signal and a second multiplexer signal that deviates therefrom, and
    a storage device having at least a first storage unit for buffer storing the first multiplexer signal and a second storage unit for buffer storing a time-limited integral value of the second multiplexer signal, the method comprising:
    inputting the first multiplexer signal and the second multiplexer signal via an interface to the storage device; and reconstructing an image signal representing the image using the first multiplexer signal and the second multiplexer signal.

15. A device comprising units configured to sense a light signal, the device configured to:
convert the light signal into a processing signal;
generate at least a first multiplexer signal and a second multiplexer signal that deviates therefrom using the processing signal; and
buffer store a time-limited integral value of the first multiplexer signal in a first storage unit and a time-limited integral value of the second multiplexer signal in a second storage unit.

* * * * *